(12) United States Patent
Altkorn et al.

(10) Patent No.: US 8,276,091 B2
(45) Date of Patent: Sep. 25, 2012

(54) HAPTIC RESPONSE SYSTEM AND METHOD OF USE

(75) Inventors: Robert Altkorn, Chicago, IL (US); Xiao Chen, Naperville, IL (US); Scott Milkovich, Glen Ellyn, IL (US); John Owens, Oak Lawn, IL (US); Brian Rider, Sommerville, MA (US); Eugene Rider, Oak Brook, IL (US); Daniel Stool, Addison, IL (US)

(73) Assignee: Ram Consulting, Oak Brook, IL (US)

( * ) Notice: Subject to any disclaimer, the term of this patent is extended or adjusted under 35 U.S.C. 154(b) by 1417 days.

(21) Appl. No.: 10/941,088

(22) Filed: Sep. 15, 2004

(65) Prior Publication Data

US 2005/0093847 A1 May 5, 2005

Related U.S. Application Data

(60) Provisional application No. 60/502,983, filed on Sep. 16, 2003.

(51) Int. Cl.
*G06F 3/048* (2006.01)

(52) U.S. Cl. ........ 715/771; 715/701; 715/763; 715/799; 715/810; 715/848; 715/861; 345/621; 345/622; 345/630; 345/653; 345/664; 345/679

(58) Field of Classification Search ............... 703/7, 11; 345/621, 622, 630, 653, 664, 679; 715/701, 715/771
See application file for complete search history.

(56) References Cited

U.S. PATENT DOCUMENTS

| | | | | |
|---|---|---|---|---|
| 3,704,529 A | * | 12/1972 | Cioppa | 434/272 |
| 4,850,876 A | * | 7/1989 | Lutaenko et al. | 434/265 |
| 5,174,283 A | * | 12/1992 | Parker | 128/200.26 |
| 5,339,805 A | * | 8/1994 | Parker | 128/200.26 |

(Continued)

FOREIGN PATENT DOCUMENTS

WO  WO 96/28800  9/1996

(Continued)

OTHER PUBLICATIONS

Ask Search, http://www.ask.com/web?q=virtual+passageway+haptic&qsrc=0&o=0&l=dir&oo=0.*

(Continued)

*Primary Examiner* — Boris Pesin
*Assistant Examiner* — John Heffington
(74) *Attorney, Agent, or Firm* — Polsinelli Shughart PC; Teddy C. Scott, Jr.; Robert Enyard

(57) ABSTRACT

An apparatus and method for assessing a hazard associated with an object are disclosed. The apparatus includes a haptic input/output device coupled to a computer with haptic modeling software and a display device. A virtual object and a virtual passageway are displayed on the display device. The virtual passageway includes a haptic layer along a surface thereof. Force applied by a user to the haptic input/output device causes a cursor on the display device to move the virtual object into the virtual passageway. An interaction of the virtual object with the haptic layer generates a virtual contact force which may be determined by the user sensing a corresponding tactile feedback force generated by the haptic input/output device and/or by the computer processor. The magnitude of the virtual contact force may be used to assess a hazard associated with the virtual object.

38 Claims, 12 Drawing Sheets

U.S. PATENT DOCUMENTS

| | | | | |
|---|---|---|---|---|
| 5,471,399 | A * | 11/1995 | Tanaka et al. | 716/126 |
| 5,588,914 | A * | 12/1996 | Adamczyk | 463/32 |
| 5,625,128 | A * | 4/1997 | Wilson et al. | 800/9 |
| 5,922,018 | A * | 7/1999 | Sarvazyan | 600/587 |
| 6,049,622 | A * | 4/2000 | Robb et al. | 382/128 |
| 6,069,632 | A * | 5/2000 | Mullaly et al. | 345/419 |
| 6,125,375 | A * | 9/2000 | Atkins et al. | 715/207 |
| 6,191,796 | B1 * | 2/2001 | Tarr | 345/581 |
| 6,192,329 | B1 * | 2/2001 | Rider et al. | 703/6 |
| 6,225,999 | B1 * | 5/2001 | Jain et al. | 715/734 |
| 6,327,618 | B1 * | 12/2001 | Ahlstrom et al. | 709/223 |
| 6,345,112 | B1 * | 2/2002 | Summers et al. | 382/128 |
| 6,556,696 | B1 * | 4/2003 | Summers et al. | 382/128 |
| 6,705,319 | B1 * | 3/2004 | Wodicka et al. | 128/207.14 |
| 6,714,901 | B1 * | 3/2004 | Cotin et al. | 703/7 |
| 6,834,966 | B1 * | 12/2004 | Moquin | 353/94 |
| 7,061,467 | B2 * | 6/2006 | Rosenberg | 345/156 |
| 7,084,868 | B2 * | 8/2006 | Farag et al. | 345/419 |
| 7,130,457 | B2 * | 10/2006 | Kaufman et al. | 382/128 |
| 7,134,093 | B2 * | 11/2006 | Etgen et al. | 715/786 |
| 7,269,348 | B1 * | 9/2007 | Tse-Au | 398/25 |
| 7,333,648 | B2 * | 2/2008 | Edic et al. | 382/131 |
| 7,409,647 | B2 * | 8/2008 | Elber et al. | 715/848 |
| 2002/0143276 | A1 * | 10/2002 | Ernst | 600/590 |
| 2003/0016850 | A1 * | 1/2003 | Kaufman et al. | 382/128 |
| 2003/0103077 | A1 * | 6/2003 | Despotidis et al. | 345/734 |
| 2003/0179249 | A1 * | 9/2003 | Sauer et al. | 345/848 |
| 2003/0197734 | A1 * | 10/2003 | Binkert et al. | 345/771 |
| 2004/0223636 | A1 * | 11/2004 | Edic et al. | 382/131 |
| 2004/0257532 | A1 * | 12/2004 | Moquin | 353/30 |
| 2007/0019849 | A1 * | 1/2007 | Kaufman et al. | 382/128 |
| 2007/0038080 | A1 * | 2/2007 | Salisbury et al. | 600/427 |
| 2009/0192975 | A1 * | 7/2009 | Seder | 706/54 |

FOREIGN PATENT DOCUMENTS

WO    WO 02/070980    9/2002

OTHER PUBLICATIONS

Ask Search, http://www.ask.com/web?qsrc=1&o=0&l=dir&q=anatomical+model+haptic&oo=0.*

Sofiane Sarni, et al., "Evaluation and Visualization of Stress and Strain on Soft Biological Tissues in Contact" (2004). Virtual Reality Lab (VRlab), Swiss Federal Institute of Technology (EPFL). pp. 1-8; <http://vrlab.epfl.ch/~amaciel/docs/sarni_marciel_boulic_thalmam_smi04.pdf>, Lausanne, Switzerland.

Nürnberger, Andreas, et al. "Determination of Elastodynamic Model Parameters Using a Recurrent Neuro-Fuzzy System." (May 18, 1999). Institute of Knowledge Processing and Language Engineering. All Pages; <http//fuzzy.cs.uni-magdeburg.de/publications/NueRadKru99.pdf>. University of Magdeburg, Germany.

* cited by examiner

HAPTIC RESPONSE SYSTEM AND METHOD OF USE

CROSS REFERENCE TO RELATED APPLICATIONS

This application claims priority to U.S. Provisional Application No. 60/502,983 filed on Sep. 16, 2003, which is incorporated herein by reference in its entirety.

FIELD OF THE INVENTION

The invention relates to hazard assessment simulators, and more particularly to a haptic response system and method of use which enables a user to assess a hazard, such as a choking, aspiration, or blockage hazard, in humans caused by an inanimate object.

DESCRIPTION OF RELATED ART

Haptic, or force feedback, technology includes hardware and associated software that allows a user to physically feel objects existing in a virtual (e.g., computational) environment. Haptic hardware integrates force sensors and motors or actuators and is often shaped to simulate specific tools, such as surgical devices or sculpting tools. In haptic technology, haptic hardware replaces conventional tactile computer input devices such as a mouse, trackball, or keyboard. The force sensors measure a magnitude and direction of forces applied by a user and input these measurements to a computer. Software installed on the computer converts the inputted measurements into movement of one or more virtual objects that are displayed on a display device, calculates one or more interactions between objects, and outputs the interactions as computer signals. The motors or actuators in each input/output device resist forces applied by a user, or apply forces to the user, pursuant to the signals received from the computer.

Various haptic hardware devices have been developed. Illustratively, known haptic hardware devices include a MagLev Wrist developed by Carnegie Mellon University, an Eye Surgery Simulator developed by Georgia Tech University, a Laparoscopic Impulse Engine developed by Immersion Corporation, and a Cybergrasp Force Feedback Glove developed by Virtual Technologies, Inc.

Haptic technologies have been applied to various disciplines, including the training of surgeons in minimally invasive surgery or other medical procedures. Specific medical procedures for which haptic technologies have been developed include, for example, bronchoscopy, urinary tract endoscopy, epidural injections, cardiovascular surgery, and gynecology. These technologies are specifically designed to mimic the interaction between a surgical instrument and a part of the human body. However, currently, such haptic systems may not accurately model the forces experienced during the actual surgery or performance of a medical procedure for various reasons, the foremost being the inaccurate modeling techniques. For example, these known haptic models do not account for variations in the size, shape, and elasticity over different population groups. Thus, the modeling is generally a "gross" calculation of a particular body part and interactions with a surgical tool, without taking into account variables that may exist between persons.

Additionally, the known haptic surgical simulators do not provide body parts that are dimensionally sized and imbued with specific material properties unique to persons within a particular age group. Consequently, such simulators cannot generate anatomically correct models of parts of the human body that are statistically representative of a particular sector of the population.

Moreover, surgical haptic response simulators are generally modeled to show an interaction strictly with a surgical tool and a body part. Such interaction is very limited to the human manipulation of a surgical instrument (e.g., cutting and moving), ranging from incisions in the skin to removal of body parts such as a spleen, cataracts, etc. These systems do not model objects which have no human interaction such as, for example, objects which were accidentally swallowed. Additionally, these simulators are primarily concerned with modeling the treatment and repair of body parts, not with determining how inanimate objects interact with the human body in way that creates an injury hazard, such as causing a blockage with a passageway located within the body.

Other haptic applications include virtual assembly path planning and virtual maintenance path planning. Virtual assembly path planning haptic technologies permit users to manipulate or simulate tools and components within a virtual environment to verify that an assembly process may be successfully completed. Similarly, virtual maintenance path planning technologies permit users to manipulate tools and components within a virtual environment to confirm that a broken component may be removed and replaced by a working component. Consequently, the haptic training systems used in virtual assembly path planning and virtual maintenance path planning simulate mechanical systems that exist outside the human body. As such, they are not concerned with, nor configured to show interactions with a part of the human body.

SUMMARY OF THE INVENTION

In one embodiment, the invention provides a virtual haptic response system and method of use that enable a user to assess a choking, ingestion, blocking, insertion, aspiration, or any other physical hazard in humans caused by an inanimate object. As an example, the virtual haptic response system and method of use enables assessment of a hazard associated with an insertion of a manufactured, or yet to be manufactured, object into a human passageway. Illustratively, the object may be a toy or other articles intended for use by children, as well as other consumer products intended for use by teenagers and adults. The hazards may be assessed using an anatomically correct, virtual model of a passageway, such as, but not limited to a nasal pharynx, an oral cavity, an oral pharynx, a trachea, a hypo-pharynx, and an esophagus, and accurate, realistic tactile force feedback generated by a haptic input/output device. Additionally, the virtual model of the passageway may be dimensionally sized and imbued with specific material properties unique to persons within a particular age group. Consequently, the dimensions and material properties modeled by the virtual model of the passageway may statistically represent a particular sector of the population.

Thus, an embodiment of the invention is directed to a virtual computer model, tangibly embodied in computer executable instructions, which simulates on a display device a virtual object modeled after a particular real object, a virtual passageway modeled after a particular real human passageway, and an interaction between them. An interaction occurs when the virtual object and the virtual passageway are positioned proximate to or in contact with each other. Intensities of a force or forces generated by the interaction may be calculated and analyzed to determine whether the virtual object poses a hazard to the virtual passageway. Once calculated, the values of the generated force or forces may be processed so that one or more areas of the virtual object and/or the virtual passageway visibly deform and/or turn a non-anatomical color in response thereto.

In one embodiment, one or more forces generated by the interaction are output as computer signals to an input/output device manipulated by a user. In response, one or more actuators within the input/output device generate one or more feedback forces that simulate an intensity level of one or more real forces that would be exerted if an interaction occurred between the real object and the real passageway. The force feedback enables the user to determine whether the virtual object is capable of traversing the virtual passageway, and if not, where in the virtual passageway the virtual object is likely to lodge. The intensity of one or more calculated forces may be displayed on the display device by color variations and/or alphanumeric data.

DETAILED DESCRIPTION OF EMBODIMENTS OF THE INVENTION

In one embodiment, the invention provides a virtual haptic response system and method that enables a user to visually and tactilely assess a choking, ingestion, blocking, insertion, aspiration, or other hazard associated with an insertion of a manufactured, or yet to be manufactured, object into a human passageway. Illustratively, the object may be a toy or other article intended for use by children, as well as other consumer or food products intended for use by any age group. The object may be modeled by a virtual object that includes the dimensions and material properties of the real object.

Hazards associated with the object may be assessed by interacting the virtual object with an anatomically correct, virtual passageway that models a real human passageway, such as, but not limited to, a nasal pharynx, an oral cavity, an oral pharynx, a trachea, a hypo-pharynx, and an esophagus. The virtual passageway may be dimensionally sized and imbued with specific material properties unique to persons within a particular age group. Additionally, the dimensions and material properties modeled by the virtual passageway may be statistically obtained to represent a particular sector of the population.

In one embodiment, a haptic input/output device is connected to a display device through a computer. The display device displays a two-dimensional or three-dimensional view of a virtual object and a virtual passageway, both of which may model the exact or substantially exact dimensions and material characteristics of a real object and a real passageway, respectively. The display device may also indicate a magnitude of a force caused by an interaction of the virtual object with the virtual passageway. Additionally, the haptic input/output device may generate a tactile force that enables a user to feel the interaction of the virtual object with the virtual passageway in order to assist in assessing a degree of hazard associated with the virtual object. Optionally, assessment of the hazard may be performed by the computer itself using computational techniques. Simulating a design of an object being considered for manufacture and testing it for hazards in the manner described herein enables the designer and/or manufacturer to modify the object's dimensions and/or material properties early in the design cycle, which reduces costs and saves time.

System of the Invention

Figure 1A:
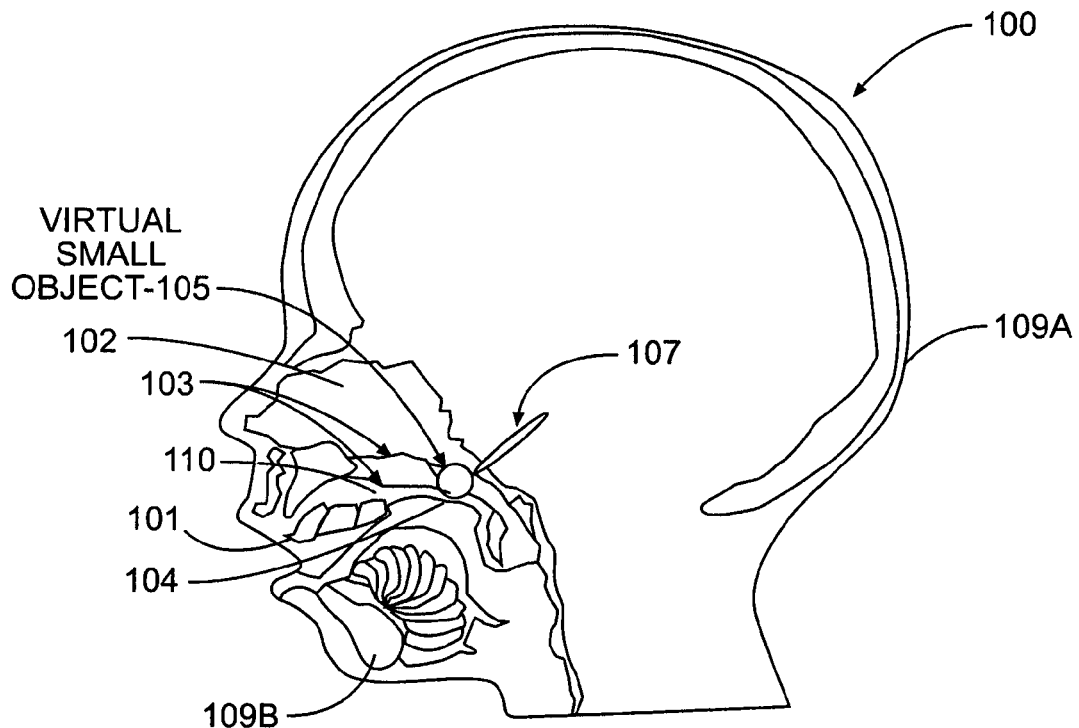
FIG. 1A is a cut-away, profile view of a virtual human head showing placement of a virtual object within a virtual airway, according to one embodiment of the invention.

FIG. 1A is a cut-away, profile view of a virtual human head 100 showing placement of a virtual object 105 within a virtual passageway 110. The head 100 includes a haptic layer 103, which may be a virtual, complex, computer-generated surface that forms an interface between the virtual passageway 110 and corresponding portions of the head 100. The haptic layer 103 may be formed using, for example, Boolean subtraction to remove a volume having the size and shape of a normal or expanded passageway from the head 100. The haptic layer 103 may be used to calculate a magnitude of a contact force (or contact forces) exerted between the virtual object 105 and the virtual passageway 110.

Additionally, as shown in FIG. 1A, the haptic layer 103 may be positioned to correspond to an inner surface of a passageway. For example, the haptic layer 103 may be positioned on an inner surface of a nasal passageway 102. Similarly, another haptic layer 103 may be positioned on an inner surface of an oral passageway 101. Although the haptic layer 103 may not be visible to a user, the user may deduce its position by a tactile force generated by a haptic input/output device whenever the virtual device interacts with the haptic layer 103. The haptic layer may be toggled on and off. In the latter case, no force feedback is provided.

The virtual object 105 may be, for example, a computer generated model of a real object. Accordingly, the virtual object 105 may have the exact dimensions and material properties (modulus of elasticity, poisson's ratio, density, texture, friction, etc.) of a natural object, a manufactured object, or a yet to be manufactured object. The dimensions and material properties of the real object may be obtained from reference sources or experimentally measured data. These properties may be linear or non-linear, isotropic or anisotropic, homogeneous or inhomogeneous. Once obtained, the dimensions and material properties of the virtual object and virtual passageway may be imported or otherwise input into a computer program that creates the virtual object 105 and the virtual passageway 110, respectively. In one embodiment, an optional handle 107 connected to the object 105 is provided so that a user can more clearly see an interaction of the object 105 with the virtual passageway 110. Additionally, the handle 107 may be used to manipulate the virtual object 105 through a portion of the virtual passageway 110, or to position the virtual object 105 at any particular location within the virtual passageway 110 for hazard assessment. In an implementation, the virtual object 105 may be created using the FreeForm® Concept™ software produced by SensAble Technologies, Inc. of Woburn, Mass., or other graphical software programs.

The virtual passageway 110 may be, for example, a computer generated model of a nasal pharynx, an oral cavity, an oral pharynx, a trachea, a hypopharynx, an esophagus, or other anatomical entity, such as an ear canal, a lumen, intestine, lungs, or other passageway. In an implementation, the virtual passageway 110 will accurately represent, anatomically, a human passageway. This accurate representation will include the interaction of tissue, bone, and muscle groups associated with the passageway. The dimensions of such tissues, bone, and muscle groups may be determined using MRI modeling, CT modeling, statistical modeling, or other empirical data discussed below. The material properties of such tissues, bone, and muscle groups may be determined by direct measurement, or from compilations such as H. Yamada, Strength of Biological Materials, Wilkins and Williams, Baltimore, Mass., 1970, herein incorporated in its entirety, or from statistical modeling of data from a single or multiple sources. In one embodiment, the virtual passageway will comprise the haptic layer in order to provide feedback and modeling according to an aspect of the invention. The model of FIG. 1A, as well as any of the remaining models of the invention may further include one or more reference layers 109A and 109B.

In an implementation, the reference layers are computer-generated artistic or mathematical renderings of certain anatomical features that may have a fixed shape. In an embodiment, the reference layers may include haptic properties, such that a user will feel resistance (e.g., feedback force) when passing the virtual object through one or more of the reference layers. In an embodiment, one or more of the reference layers may be toggled off to permit placement of the virtual object at any particular location of the virtual passageway, and then toggled back on to provide a cumulative resistance that, combined with the resistance provided by the haptic layer, realistically simulates the force(s) exerted by and on the virtual object. Alternatively, once the virtual object is positioned, only the reference layer(s) may be toggled on to permit determination of the resistance(s) provided by the tissues which surround the virtual passageway. The one or more reference layers 109A and 109B may be simultaneously displayed with a visible or invisible haptic layer 103 to provide frames of reference to a user and to enable the user to better understand and visualize relevant anatomy. Additionally, the reference layers may be toggled on and off separately, or simultaneously.

The one or more of the reference layers 109A and 109B may be created using data imported from MRI scans and CT scans, together, or separately, with other inputted data that is either experimentally measured or obtained from reference sources. A combination of MRI and CT scans is preferable because MRI scans offer excellent soft tissue discrimination, and CT scans offer excellent bone discrimination. In an implementation, the reference layers 109A and 109B, and the haptic layer 103, may be created using multiple software applications and then imported into the FreeForm® or other development environment.

In one embodiment, high resolution CT and MRI scans, in DICOM or other format, are imported into a software program that allows each scan to be viewed individually, and which recreates an approximate volumetric representation of a head or other body part using a polygonal or other finite element mesh that may serve as the basis for a virtual spring-mass damper model or other mathematical method of modeling the material properties of tissues. One such software program is the Mimics software program, manufactured by Materialise, Inc. of Ann Arbor, Mich. However, other software programs may be used with the invention.

Once the data from the CT and MRI scans is imported, reference layers that correspond to specific anatomical entities, such as the skull layer 109A and the mandible layer 109B, may be isolated by "filtering" one or more CT or MRI images. Filtering may include highlighting only those areas of the image that correspond to a specific range of gray shades. After filtering, the selected anatomical entities are exported by the software program in .stl (stereolithography) format, and imported into sculpting or general geometrical modeling software such as FreeForm® Concept™ Software, where the quality of the images may be improved and extraneous tissue identical in density to the desired anatomical entity may be removed, according to a user's preference.

In an implementation, one or more pre-assembled virtual objects 105, virtual passageways 110, reference layers 109A and 109B, and haptic layers 103 may be stored in one or more databases for later retrieval by a user. This enables a user to select from among a range of choices. For example, embodiments of pre-assembled virtual objects 105 may include square, round, rectangular, polygonal, and other shaped objects, of various sizes, textures, and rigidity. Additionally, embodiments of virtual passageways 110, may include anatomically correct, non-anatomically correct, and statistically characterized passageways.

In one embodiment, the virtual passageway 110 is not only anatomically correct, but it also includes anatomical measurements and/or material properties that have been statistically correlated to correspond to a particular age group. For example, the virtual passageway 110 shown in FIG. 1A may represent a passageway having the dimensions and material properties most likely to be found in the $75^{th}$ percentile of children ages 3 years to 6 years. Naturally, the invention is not limited to this percentile or age group, but may include any other percentile or age group.

One technique for creating a statistically characterized virtual passageway 110 may include obtaining detailed external and internal anatomical measurements for different age groups and different demographic groups of children, teenagers, or adults. Illustratively, external anatomical measurements such as height and various facial dimensions for children in different age and demographic groups may be obtained from existing reference sources. In some cases, the dimensions of internal passageways may also be obtained from existing reference sources. However, in some cases, existing studies of human passageways may not provide sufficient data to provide a statistical basis for embodiments of the present invention. Accordingly, in one implementation, internal passageway dimensions from CT and MRI scans may be obtained and compared with measurements of external anatomical features in the same CT and MRI scans to find an external anatomical feature that correlates with an internal anatomical feature. The best-correlated pair of external and internal features may then be used to statistically calculate the passageway's size percentile within a particular population group.

Illustrative measurements obtained from MRI or CT scans include, but are not limited to, head length (mm), head width (mm), and tragion-to-menton distance (mm). In an embodiment of the invention that assesses hazards associated with an object placed in the passageway of a child, these measurements are preferable because they have been tabulated for children of different ages in L. W. Schneider, R. J. Lehman, M. A. Pflug, and C. L. Owings, "Size and Shape of the Head and Neck from Birth to Four Years, University of Michigan Transportation Research Institute Publication UMTRI-86-2, January 1986, which is herein incorporated by reference in its entirety. Consequently, these measurements may serve as independent variables in correlation assessment.

Other internal measurements may serve as dependent variables in the correlation analysis. Such other internal measurements include, but are not limited to: bassioccipital to incisal edge length (mm), bassioccipital to posterior hard palate length (mm), bassioccipital to superior epiglottis length (mm), bassioccipital to superior hyoid length (mm), molar to molar length (mm), epiglottis width (mm), epiglottis length (mm), vocal ligament width (mm), and vocal ligament length (mm).

Once the appropriate internal measurements are obtained, correlation analysis may be performed to test the significance level of a correlation between each pair of independent and dependent variables. The independent variable that is the most significantly correlated with all dependent variables is selected as the indicator variable (anatomical marker). Probability distributions are then fitted for each indicator variable, within each age group, according to statistics from an existing case study, for example, but not limited to, the University of Michigan study mentioned above. A best fitting distribution is then chosen based on one of the Chi-Square, Kolmorgorov-Smirnov, and/or Anderson Darling tests, or other appropriately statistical methods.

Once the best-fitting distribution is determined, a relative position (e.g., the nth percentile in a specific age group) of the indicator variable may signify the location of each subject in terms of measurements of all dependent variables. Additionally, a single MRI or CT scan may be used in multiple age categories (e.g., the same scan may represent a 25th percentile in the age group of 3 years to 4 years and a 50th percentile in the age group of 2 years to 3 years). Statistical characterization of the dimensions and/or material properties of a passageway enables the storing of two or more statistically characterized virtual passageways in a database for later retrieval by a user.

Figure 1B:
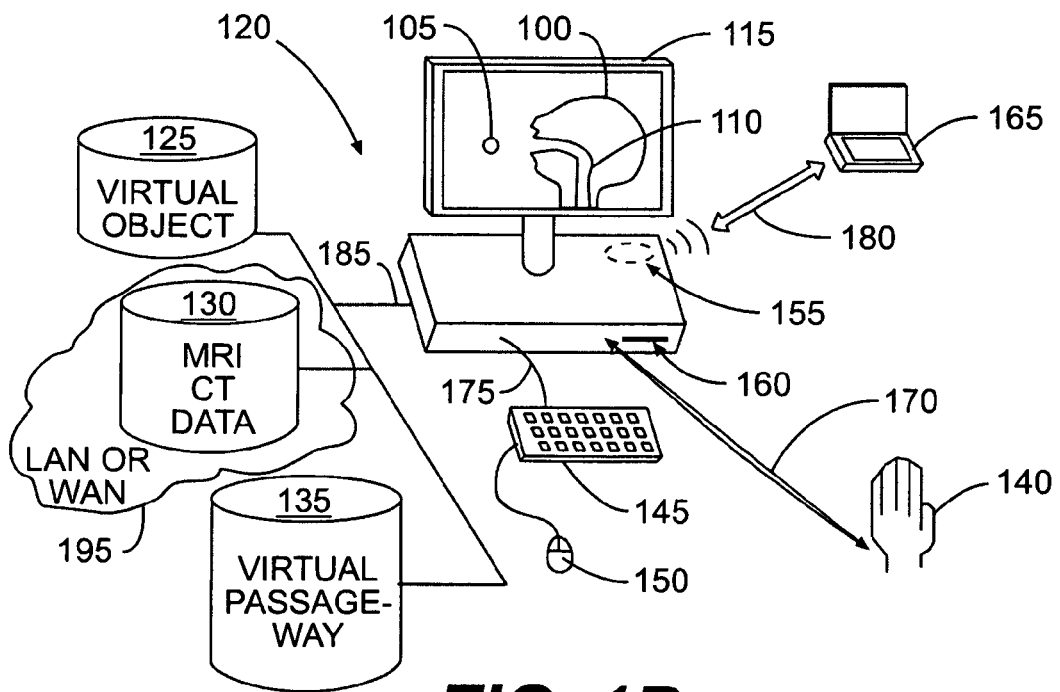
FIG. 1B is a perspective view of an apparatus useable with an embodiment of the invention.

FIG. 1B shows an apparatus implementing the invention. The apparatus may include a display device 115, a computer 120, databases 125, 130, and 135, haptic input/output device 140, keyboard 145, mouse 150, and (optionally) scanner 165. The display device 115 may be a flat panel plasma display, a cathode-ray-tube display, or other display device. The display device 115 displays a two-dimensional or three-dimensional image of the virtual object 105 and the virtual body part 100 that includes a virtual passageway 110. An example of a type of image that may be displayed is the two-dimensional image depicted in FIG. 1A. Illustratively, the haptic input/output device 140 may be, but is not limited to, a PHANToM® arm produced by SensAble Technologies, Inc. of Woburn, Mass. Alternatively, the haptic input/output device 140 may be custom manufactured.

The computer 120 includes a processor (not shown) connected to a memory (not shown) by a central bus (not shown). The central bus also connects the processor to a network 195, such as, but not limited to, the Internet, a local-area-network, or a wide-area network. The central bus may also connect the processor to one or more peripheral devices such as the haptic input/output device 140, keyboard 145, mouse 150, wireless antenna 155, disc drive 160, and (optionally) a scanner 165.

A wired or wireless communications channel 170 conveys signals between the processor and the haptic input/output device 140 so that a user-initiated movement of the haptic input/output device causes a corresponding movement of a cursor on the display device. The cursor may be used to cause a virtual object 105 to interact with the virtual passageway 110. Additionally, the communications channel 170 also conveys signals that generate a tactile feedback force in the haptic input/output device 140 so that a user can feel the interaction of the virtual object with the virtual passageway 110 (or included haptic layer). This may allow the user, for example, to determine when an object may be irrevocably lodged within the virtual passageway. In an implementation of the invention, the signals passed between the computer processor and the haptic input/output device occur in real-time, or substantially in real-time, so that movement of the virtual object 105 and/or deformations in the virtual passageway appear to be smooth and continuous.

Signals exchanged among the processor and the keyboard 145 and/or mouse 150 are transmitted over wireless communications channel 175. Similarly, signals exchanged between the processor and the scanner 165 or other peripheral device are routed over communications channel 180.

One or more of the databases 125, 130, and 135 may be stored within the computer's memory, or stored at a remote location that is accessible over the network 195. Data may be written to and read from the databases 125, 130, and 135 over a wired or wireless communications channel 185. Data may be input to one or more of the databases 125, 130, and 135 using the keyboard 145, the disc drive 160, the scanner 165, or other peripheral device (such as, but not limited to, a MRI, CT, or other medical device). These databases may include custom software applications that mathematically detect collisions between the virtual object and the human anatomy, and solve the dynamic and static equations of motion that ultimately determine the interaction forces, stresses and strains transferred haptically between the user to the virtual product and the virtual passageway. These software applications may use a number of methods for creating the mathematical simulations including modified forms of general finite element methods.

In one embodiment, database 125 may store one or more assembled virtual objects 105. Database 130 may store MRI, CT, and other data used to assemble the virtual objects, virtual passageways, reference layers, haptic layer, and anatomical features associated with the virtual passageway. Database 135 may store a set of one or more anatomically accurate virtual passageways 110 that may include associated tissues, related reference layers, and related haptic layers. As discussed, each virtual passageway 110 may have anatomical characteristics that correspond to children or adults in different age groups. Additionally, each virtual passageway 110 may correspond to a different size percentile within one or more of the age groups.

Figure 2:
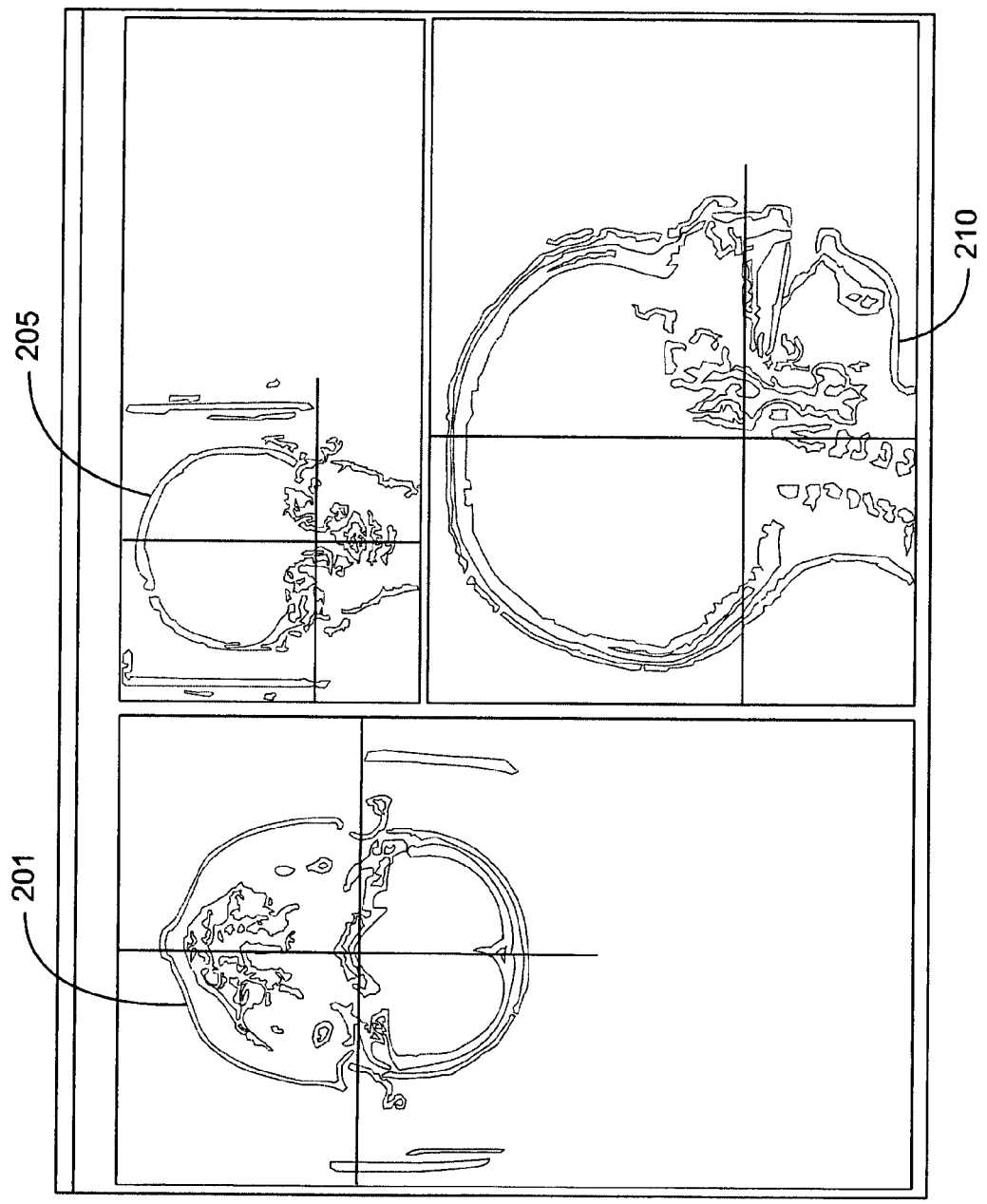
FIG. 2 is a screenshot of magnetic resonance images (MRI) used in embodiments of the invention to create the virtual human body part shown in FIG. 1.

FIG. 2 is a screenshot illustrating three MRI scans 201, 205, and 210 that may be used by embodiments of the invention to obtain internal dimensions, external dimensions, and placement of various anatomical features, such as nasal pharynx, an oral cavity, an oral pharynx, a trachea, a hypo-pharynx, and an esophagus. For example, the MRI scans 201, 205, and 210 represent top, back, and side views of a human head. Although a head is illustratively shown, other body parts may be scanned and used in accordance with the invention. As previously discussed, the data obtained from the MRI scans may be combined with data provided by CT scans and/or other radiological scans in order to capture the bone or skeletal features of the subject.

Figure 3A:
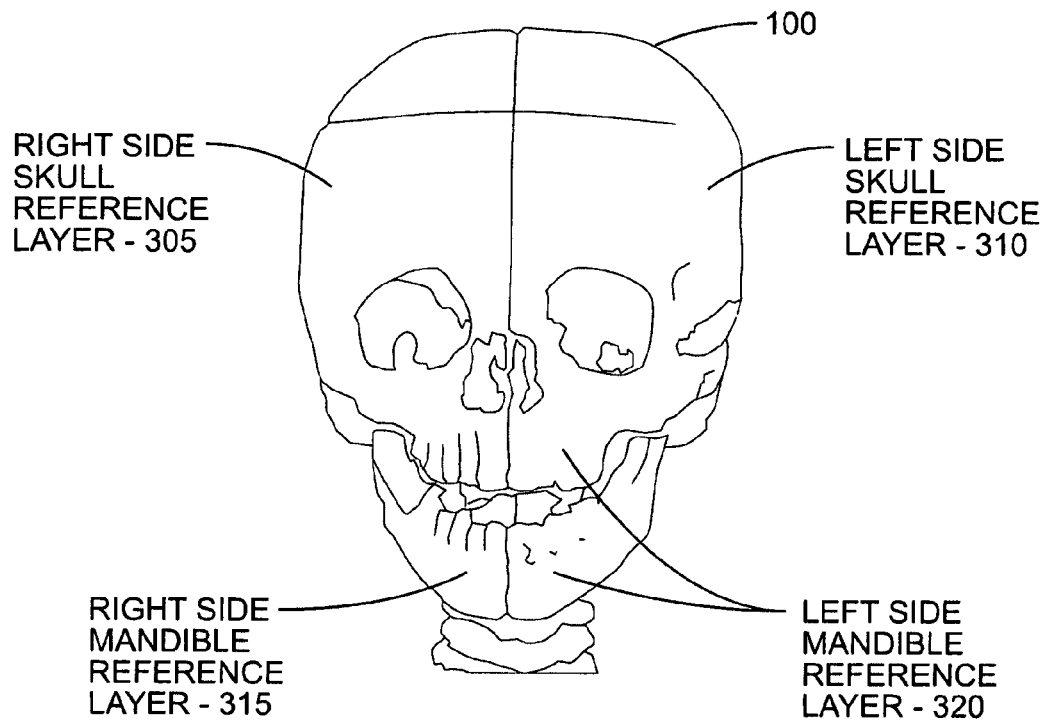
FIG. 3A is a screenshot illustrating a three-dimensional, frontal view of a human skull constructed using data and measurements obtained from the magnetic resonance images of FIG. 2, according to one embodiment of the invention.
Figure 3B:
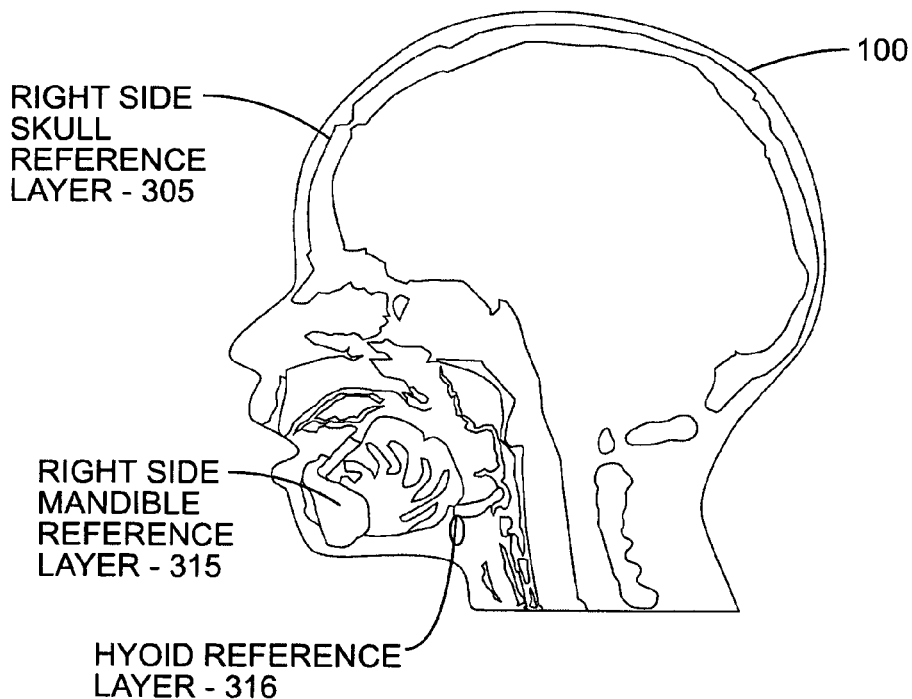
FIG. 3B is a cut-away profile view of a human head illustrating construction of reference layers, according to one embodiment of the invention.
Figure 3C:
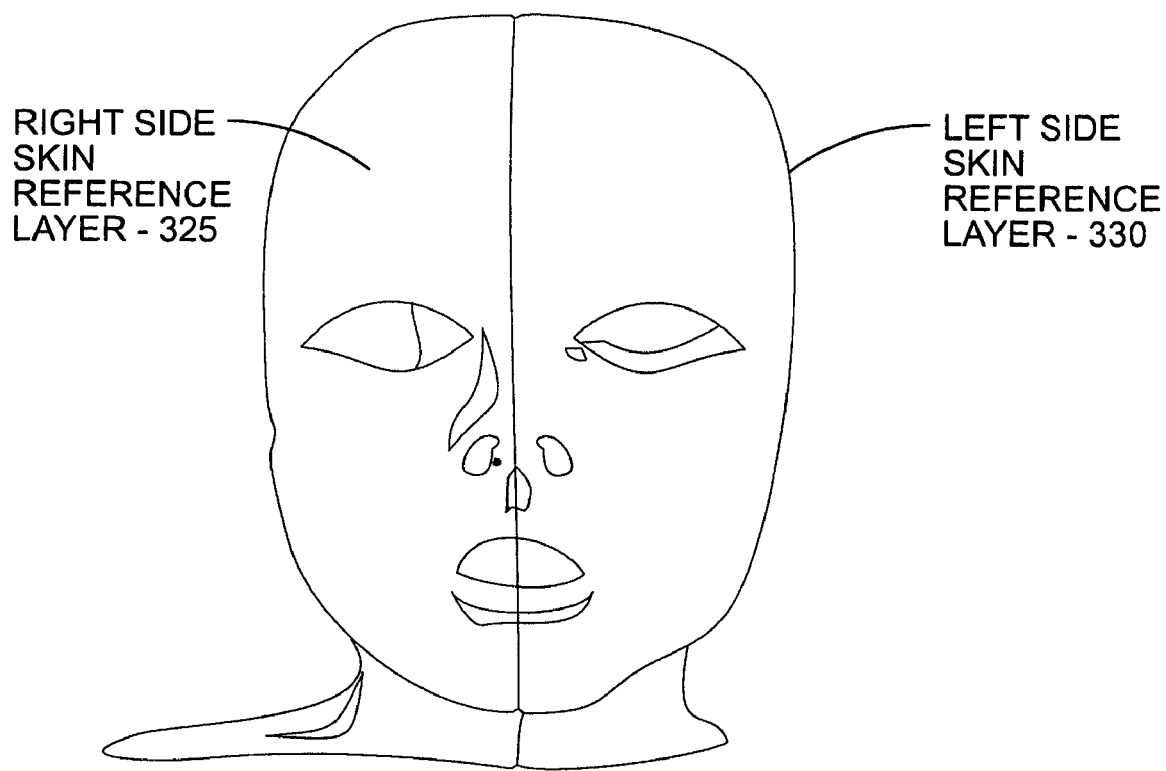
FIG. 3C is a screenshot illustrating a three-dimensional, frontal view of a child's head with left and right side skin layers, according to one embodiment of the invention.

FIGS. 3A, 3B, and 3C are screen shots illustrating a method of forming a virtual three-dimensional model of a human anatomical feature, e.g., the head 100, that includes one or more reference layers 305, 310, 315, 320, 325, and 330. For purposes of illustration, it will be assumed that the head 100 shown in FIGS. 3A-3C corresponds to the head shown in the MRI scans 201, 205, and 210 of FIG. 2. To form the three-dimensional view of the head 100 shown in FIG. 3A and/or a two-dimensional view of the head 100 shown in FIG. 3B, data obtained from the MRI scans may be imported into a software program that provides an approximate volumetric representation of the head 100 using a polygonal mesh that may serve as the basis for a virtual spring-mass damper model or other model incorporating accurate material properties.

After being filtered, the images may be imported into a sculpting, or other geometric software and edited to create the right side skull reference layer 305, left side skull reference layer 310, right side mandible reference layer 315, and left side mandible reference layer 320. These layers represent the bone structure of the head 100, and may be toggled on or off in order to insert the virtual object into a particular location within the virtual passageway and/or to enable the user to more clearly see the interaction of the virtual object with the virtual passageway. Additionally, one or more areas of each reference layer may be imbued with one or more material properties of real bone (e.g., density, friction, stiffness, etc.) so that a force exerted on the haptic layer of a passageway also interacts with one or more forces exerted by the underlying bone structure (e.g., reference layers 305, 310, 315, and 320). In other embodiments, other reference layers, may be imbued with the material properties of their corresponding real counterparts.

Referring to FIG. 3B, a side view of the head 100 of FIG. 3A is shown. A profile, cut-away view such as this one is preferable because it allows a user of the invention to see the significant portions of the virtual object and the virtual passageway. Additionally, this view shows a hyoid reference layer 316, constructed in a similar manner to the reference layers previously described.

FIG. 3C is a three-dimensional view of the head 100 of FIGS. 3A and 3B showing the implementation of skin reference layers 325 and 330. In the view shown in FIG. 3A, these skin layers are toggled off to show the underlying bone reference layers. Like the bone reference layers, the skin reference layers 325 and 330 may include one or more material properties of real skin for a particular age group. Data used to form the skin layers 325 and 330 may be obtained from the MRI and CT scans 201, 205 and 210 of FIG. 2, obtained via experimental testing of real skin, and/or obtained from existing reference sources.

Figure 4:
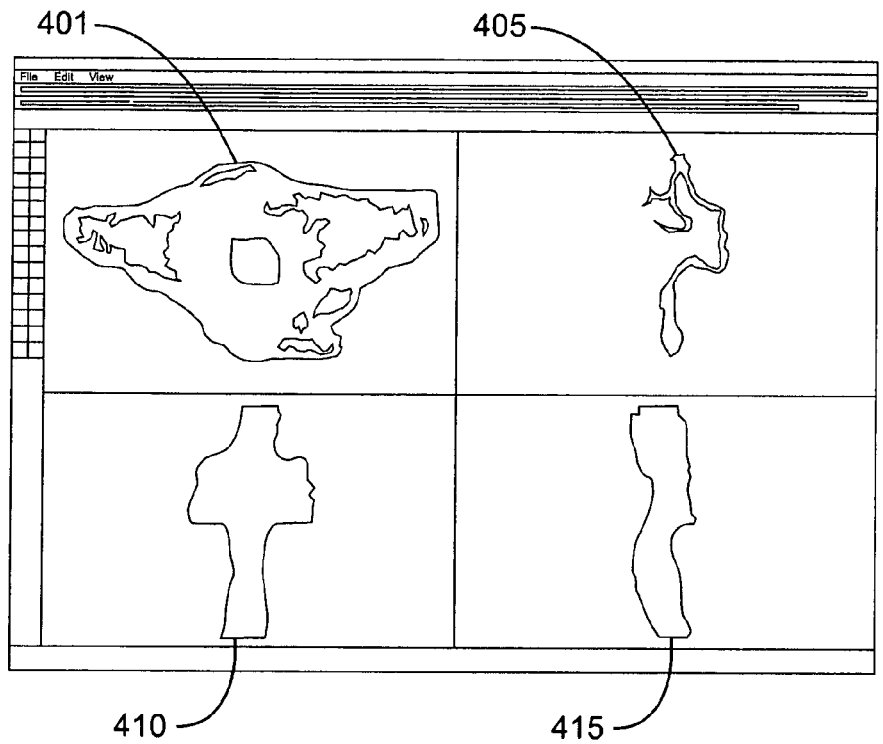
FIG. 4 is a screenshot illustrating four representative views of a model of a hypopharnyx that may define an airspace used in the haptic modeling system, according to one embodiment of the invention.

FIG. 4 is a screenshot showing four representative views 401, 405, 410 and 415 of a model of a hypopharnyx, which defines the air space used in the haptic modeling system. In particular, view 401 illustrates a color-coded top-down view of the model of the hypopharnyx. View 405 is a three-dimensional perspective view, which may also be color-coded. View 410 is a two-dimensional front view of the model of the hypopharnyx. And, view 415 is a two-dimensional side view of the model of the hypopharnyx.

In an implementation, the views 401, 405, 410, and 415 may be assembled in the same or similar manner as the reference layers shown in FIGS. 3A, 3B, and 3C. For example, the data used to create the model of the hypopharnyx shown in FIG. 4 may be obtained from MRI and CT scans of a real hypopharnyx, from experimental testing of a real hypopharnyx, or from pre-existing reference sources. This data may be imported into a computer software program that recreates an approximate volumetric model of the real hypopharnyx using a polygonal mesh. This volumetric model may be saved as a .stl file and exported to a sculpting program for editing and fine-tuning. Additionally, the virtual model of the tissues surrounding the hypopharnyx may be imbued with one or more material properties of the real hypopharnyx.

Figure 5:
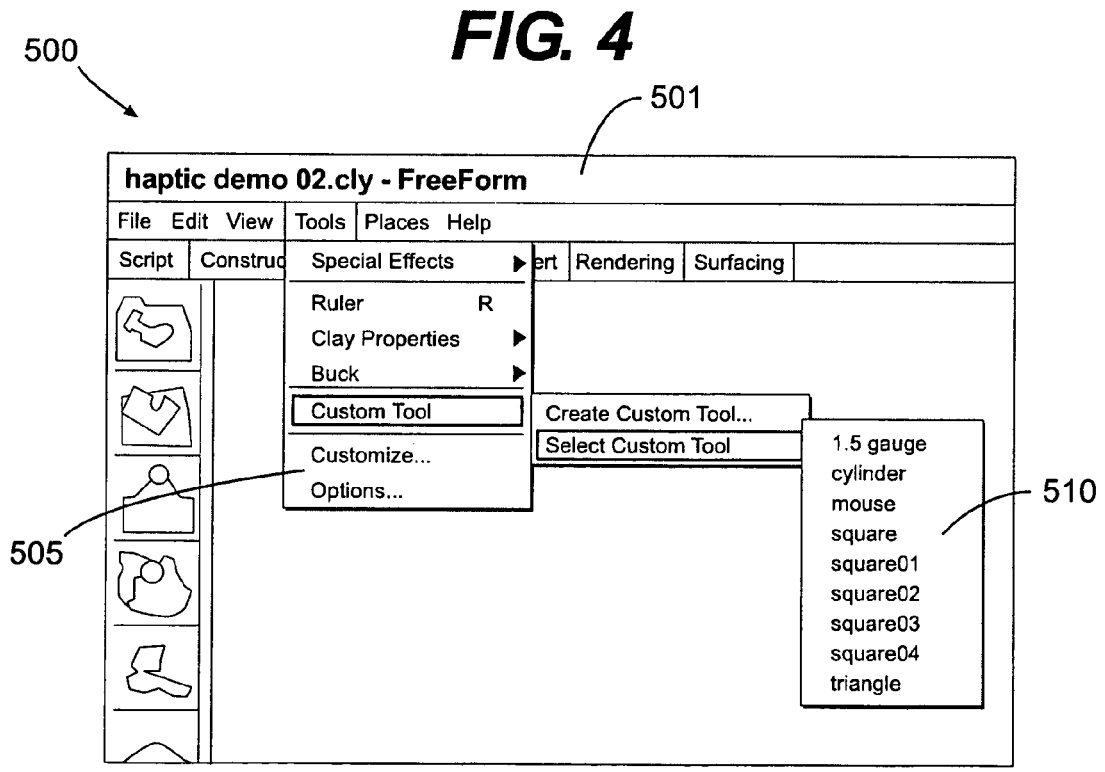
FIG. 5 is a screenshot of an exemplary interface used in an embodiment of the invention to select a type of virtual object.

FIG. 5 is a screenshot illustrating one embodiment of an interface 500 provided by an implementation of the invention. As shown, a drop down menu 505 may be selected by moving a cursor over the toolbar 501 and selecting the "Tool" heading. Thereafter, a particular shape of the object may be selected from the drop down menu 510. In this manner, the user may select from a plurality of objects, each having different material qualities. In a similar manner, the interface 500 may further include drop down menus that enable a user to select one of a plurality of pre-assembled virtual passageways or other pre-assembled anatomical entities, such as a lung, an ear canal, an intestine, a lumen, or other anatomical entity.

The data indexed by the drop down menus 505 and 510 may be stored in, and retrieved from, one or more of the databases 125, 130, and 135 that were previously shown in FIG. 1B. Using data stored in the databases 125, 130, and 135 in combination with the drop down menus 505 and 510, a user may select, and/or modify, the shape, size, material properties of a virtual object 105, virtual passageway 110, and/or one or more reference layers. Additionally, drop down menus 505 and 510 may be used to toggle the haptic layer and/or reference layer(s) on and off.

Figure 6A:
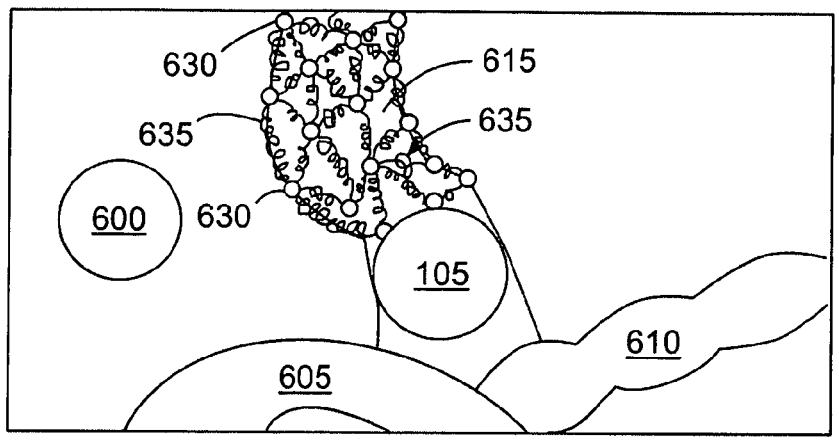
FIG. 6A is a three-dimensional virtual view of human internal organs illustrating an interaction with a virtual object positioned therein.

FIG. 6A is a three-dimensional virtual view of human internal organ 600 and passageways 605, 610, and 615. As shown, one or more reference layers in the lower section of passageway 615 are toggled off to enable viewing of a virtual object 105 that is placed within the passageway 615. In this illustrative embodiment, the virtual organ 600 represents a uterus, virtual passageway 610 represents an ileum, and virtual passageway 605 represents a tuba uterina. However, other organs and passageways may also be modeled.

The virtual organ 600 is shown covered with a non-anatomical reference layer 625 formed of point-masses 630 interconnected by spring-like connectors 635. In this manner, the virtual organ 600, or another anatomical entity may be represented by a mass-spring system, a finite element method, or deformable model of the type described in "Evaluation and Visualization of Stress and Strain on Soft Biological Tissues in Contact," by Sofiane Sarni, et. al., Proceedings of International Conference on Shape Modeling and Applications, Los Alamitos, Calif. IEEE Computer Society Press, 2004, Virtual Reality Lab, Swiss Federal Institute of Technology, which is herein incorporated by reference in its entirety.

Similarly, the virtual object 105 may also be represented by a spring-mass damper system having spring-like connectors. By using this technology, a computer processor may calculate the collision between the virtual object 105 and the haptic layer, as well as the magnitude of a force (or forces) caused by the interaction of the virtual object 105 (or virtual object 105) with the virtual passageway. However, the invention may be implemented using methods, techniques, algorithms, and formulas different than those disclosed in the above-mentioned reference.

In an implementation, the spring-like connectors 635 each have spring and damper constants that simulates a particular material property of a biological tissue that forms a real organ or passageway. Illustratively, the material properties that may be simulated include, but are not limited to, friction, texture, stiffness, vibration of spring-mass, Young's modulus of elasticity, density, inertia, and other properties. For virtual organs or virtual passageways, the spring and damper constant values of these various material properties may be obtained, for example, as described in Sarni et al.

Alternatively, one or more of the material property values (for a virtual object 105, the virtual passageways 605, 610, and 615, and the virtual organ 600) may be arbitrary values. Depending on the embodiment, the virtual object 105 may be rigid or deformable. Similarly, the virtual passageways 605, 610, and 615, and the virtual organ 600, may each be rigid or deformable.

Figure 6B:
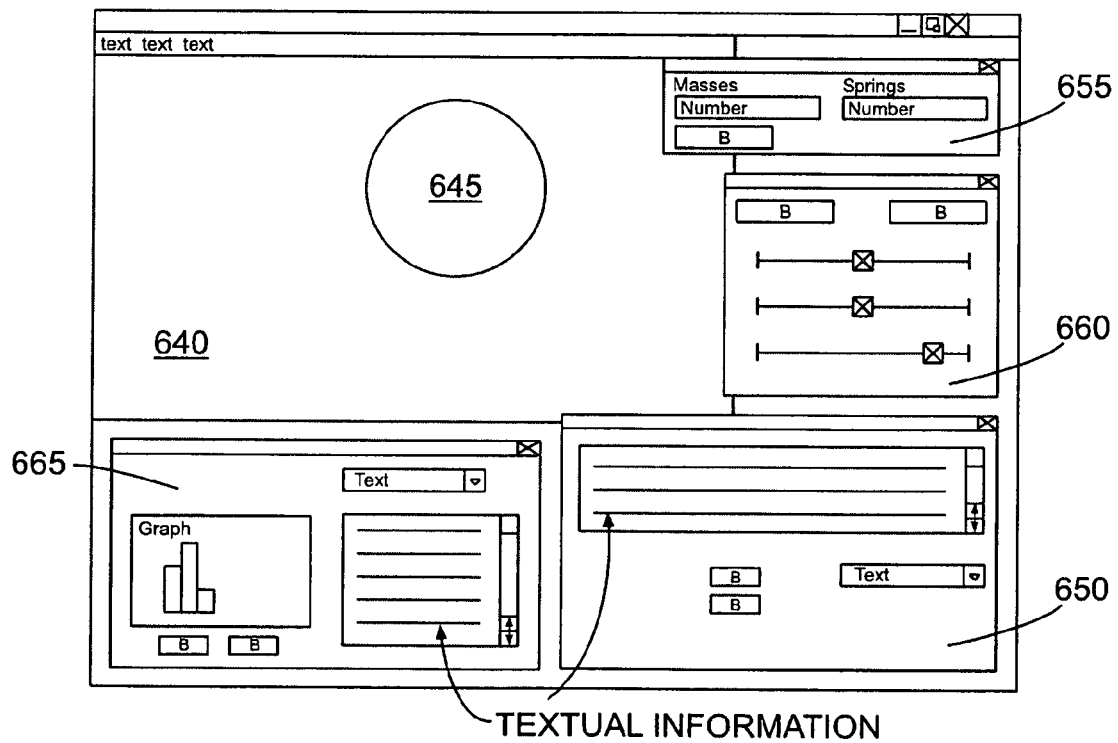
FIG. 6B is a screen shot of an exemplary interface used in an embodiment of the invention to adjust one or more spring-constant and/or mass values in one or more spring-mass models.

FIG. 6B is a screen shot of an exemplary interface 601 used in an embodiment of the invention to adjust one or more spring-constant values in a spring-mass model of a virtual object, a virtual passageway (and associated tissues), or other anatomical feature. As shown, the interface 601 may include a display window 640 in which a virtual model 645 is displayed. The interface 601 may include one or more menu areas 650, 655, 660, and 665. The virtual model 645 may be represented in either two-dimensional or three-dimensional form. Additionally, the virtual model 645 may represent a virtual object, a virtual passageway, or another virtual anatomical feature.

The data indexed by the menus 650, 655, 660, and 665 may be stored in, and retrieved from, one or more of the databases 125, 130, and 135 that were previously shown in FIG. 1B. Using data stored in the databases 125, 130, and 135 in combination with the menus 650, 655, 660, and 665, a user may select, and/or modify, the shape, size, material properties of a virtual object 105, virtual passageway, and/or one or more reference layers. Additionally, menus 650, 655, 660, and 665 may be used to toggle the haptic layer and/or reference layer(s) on and off. The interface 601 may further include a menu that permits a user to adjust the consistency, viscoelasticity, friction, etc., of the haptic layer that lines a complex inner surface of the passageway 615.

In an implementation of the invention, menu 650 presents a list of variable rules that may be used to govern the behavior of all of or parts of the virtual model 645. These rules may be used for example to implement elasticity, viscosity, and other values used to model a virtual object and/or a virtual passageway. The values of such variables may be obtained from known reference sources.

It should be further understood that many different ranges may be provided for the invention, which may be accomplished in one embodiment using one or more shifting scales or other interactive mechanisms shown on the display device. Additionally, a menu may be provided that permits a user to adjust the number of point masses 630 and the number of spring-like connectors 635 by manually inputting the desired number for each, or by selecting a number for each from a menu displayed on the display device.

The menu 665 may be manipulated using keyboard or mouse commands to adjust the types of algorithms used to calculate the deformations and/or contact force(s) generated during an interaction of the virtual object 105 with the virtual passageway 615 (and, optionally, any surrounding virtual organs, virtual passageways, or other virtual anatomical entities that surround the virtual passageway 615). The menu 665 may also be used to select the type of algorithms used to calculate the numeric values of the Elasticity, Friction, Friction Force, Shiftability, Viscosity, and spring-constant properties. Illustratively, one or more fuzzy logic sets may be used to perform these, and other, calculations.

After conducting a hazard evaluation, a different model (that may include a different set of Reference and Haptic layers which correspond to a different set of MRI and CT scans) may be selected, using the menus 650, 655, 660, and 665, to re-evaluate one or more hazards that the virtual object 105 poses for a different population group. This provides flexibility to the system, and further allows comparison between different models.

FIGS. 7A-7D are schematic diagrams that illustrate, by analogy, how a virtual object "VO" interacts with a virtual passageway, generally denoted as "VP". In this illustration, the virtual object may represent any virtual object, such as, for example, the virtual object 105 shown in FIG. 1A or FIG. 6A. Additionally, the virtual passageways illustrated in FIGS. 7A-7D may represent any virtual passageway such as that shown, for example in FIG. 1A or FIG. 6A.

Figure 7A:
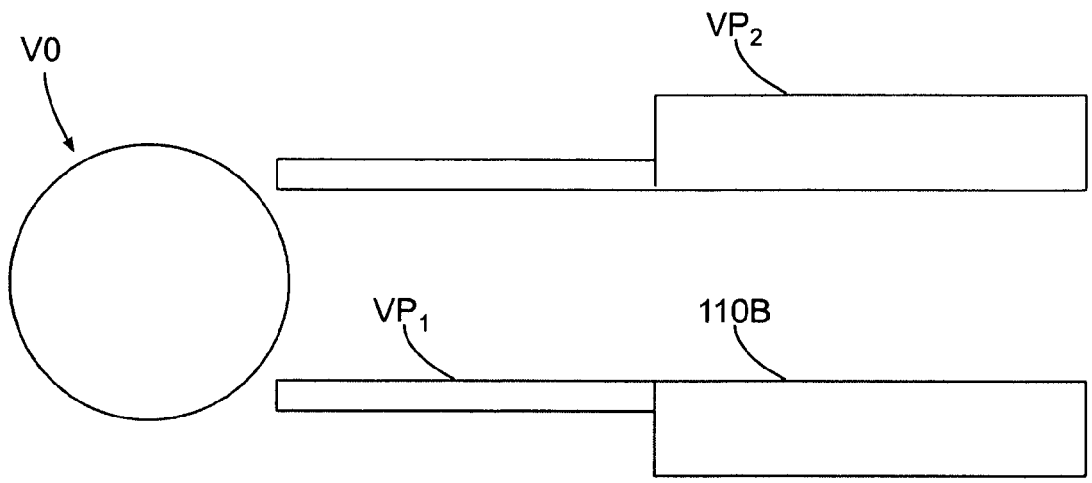
FIG. 7A is a cross-sectional, side view of a diagram used to illustrate a virtual object and a virtual passageway, according to one embodiment of the invention.
Figure 7B:
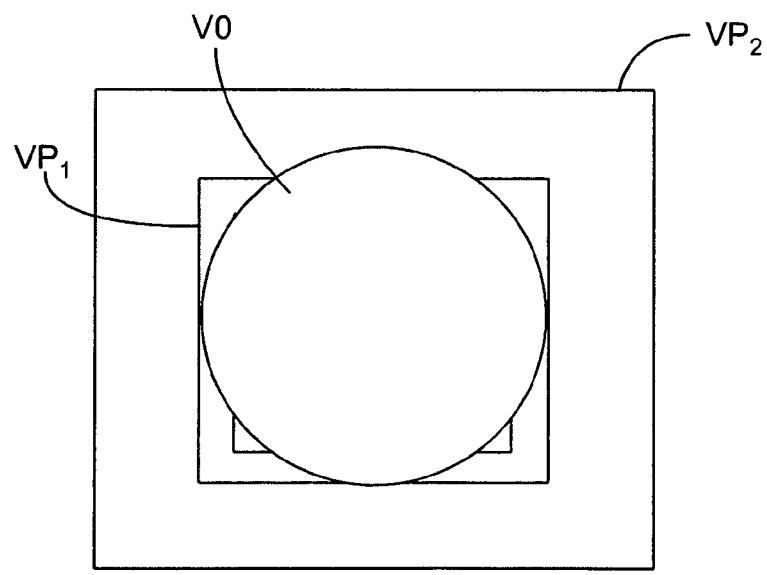
FIG. 7B is an end view of a diagram used to illustrate a virtual object and a virtual passageway, according to one embodiment of the invention.
Figure 7C:
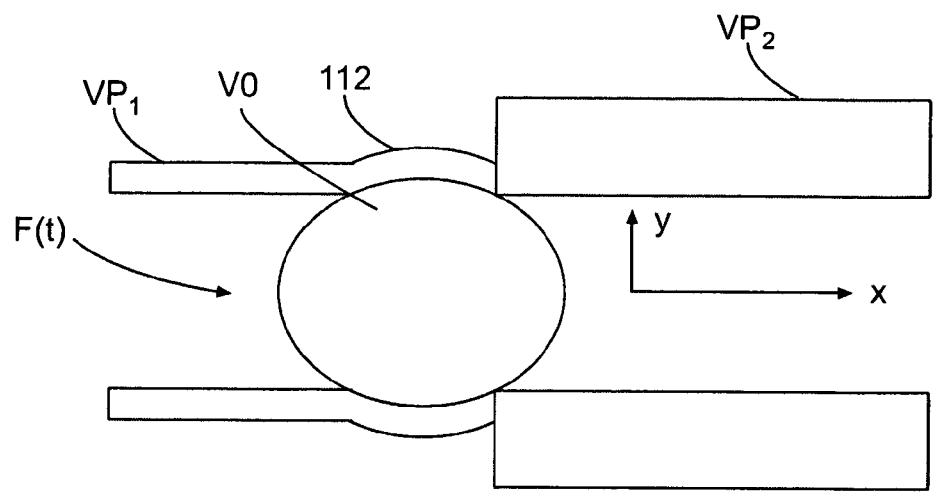
FIG. 7C is a cross-sectional, side view of a diagram used to illustrate an interaction between a virtual object and a virtual passageway, according to one embodiment of the invention.
Figure 7D:
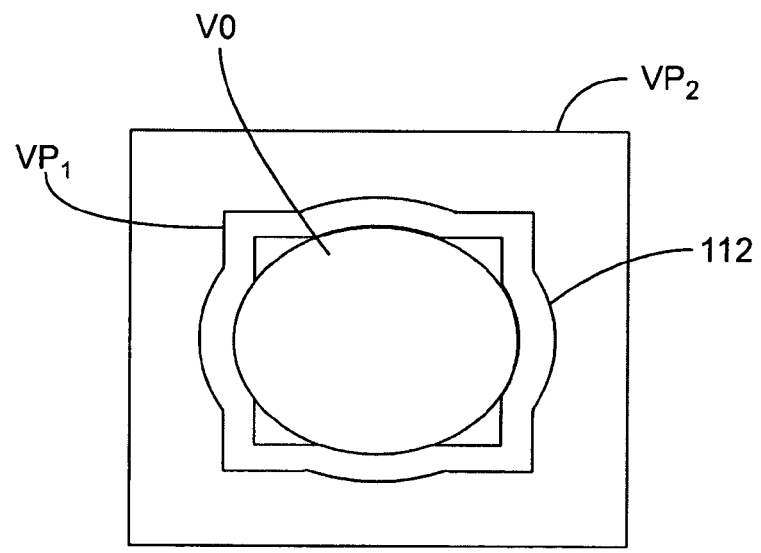
FIG. 7D is an end view of a diagram used to illustrate an interaction between a virtual object and a virtual passageway, according to one embodiment of the invention.

In FIG. 7A the virtual object VO is positioned outside the virtual passageway $VP_1$. In FIG. 7B, a virtual force F(t) is imparted to the virtual object VO to move it into the deformable passageway $VP_1$. The virtual force F(t) results from a user-initiated movement of the haptic input/output device. This user-initiated movement may be tracked by a collision detection routine that continuously looks for virtual collisions between the product and the virtual model of a human passageway. As shown in FIG. 7C, movement of the virtual object VO along the virtual passageway VP causes a collision and resulting deformations 712 to occur in the sidewalls of the virtual passageway $VP_1$. FIGS. 7C and 7D further illustrate that the virtual object VO is likely to lodge at (and/or obstruct or partially obstruct) the juncture between the virtual passageway $VP_1$ and virtual passageway $VP_2$. This is due to the fact that the diameter of the virtual passageway $VP_2$ is smaller than the diameter of the virtual object VO, and does not possess the same elasticity as virtual passageway $VP_1$. Additionally, the virtual passageway $VP_2$ has a higher rigidity than the virtual object VO, such that the virtual object VO cannot pass therethrough.

In an embodiment, a haptic layer (not shown) is positioned to correspond to the complex inner surfaces of passageway $VP_1$, and optionally $VP_2$, such that the virtual object VO cannot pass beyond the haptic layer. This constrains the virtual object VO within the interior of at least the passageway $VP_1$. Additionally, contact between the virtual object VO and the haptic layer generates a tactile feedback force in the haptic input/output device that is felt by the user. Depending on the material properties modeled by both the virtual object VO and the virtual passageway $VP_1$, the tactile feedback force may complement or resist user-initiated movements of the haptic input/output device. Additionally, the haptic input/output device may temporarily freeze in position when the virtual object VO reaches a point where it is likely to lodge within the virtual passageway $VP_1$ or the virtual passageway $VP_2$.

From FIGS. 7A-7D, it may be seen that the virtual model provides at least one or more of the following data:
- the penetration depth of the virtual object VO;
- whether the virtual object will lodge within the virtual passageway $VP_1$;
- the vector force history F(t) input required to generate the interaction; and
- the stresses and strains introduced to all the components at any particular time during the interaction.

FIGS. 8-11 show several embodiments of methods implementing the invention. It will be appreciated that the methods disclosed may include more or fewer steps, and that the steps shown and described may be performed in any convenient order. FIGS. 8-11 may equally represent high-level block diagrams of components of the invention implementing the steps thereof. The steps of FIGS. 8-11 may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code may be transferred to a workstation over the Internet or some other type of network.

Figure 8:
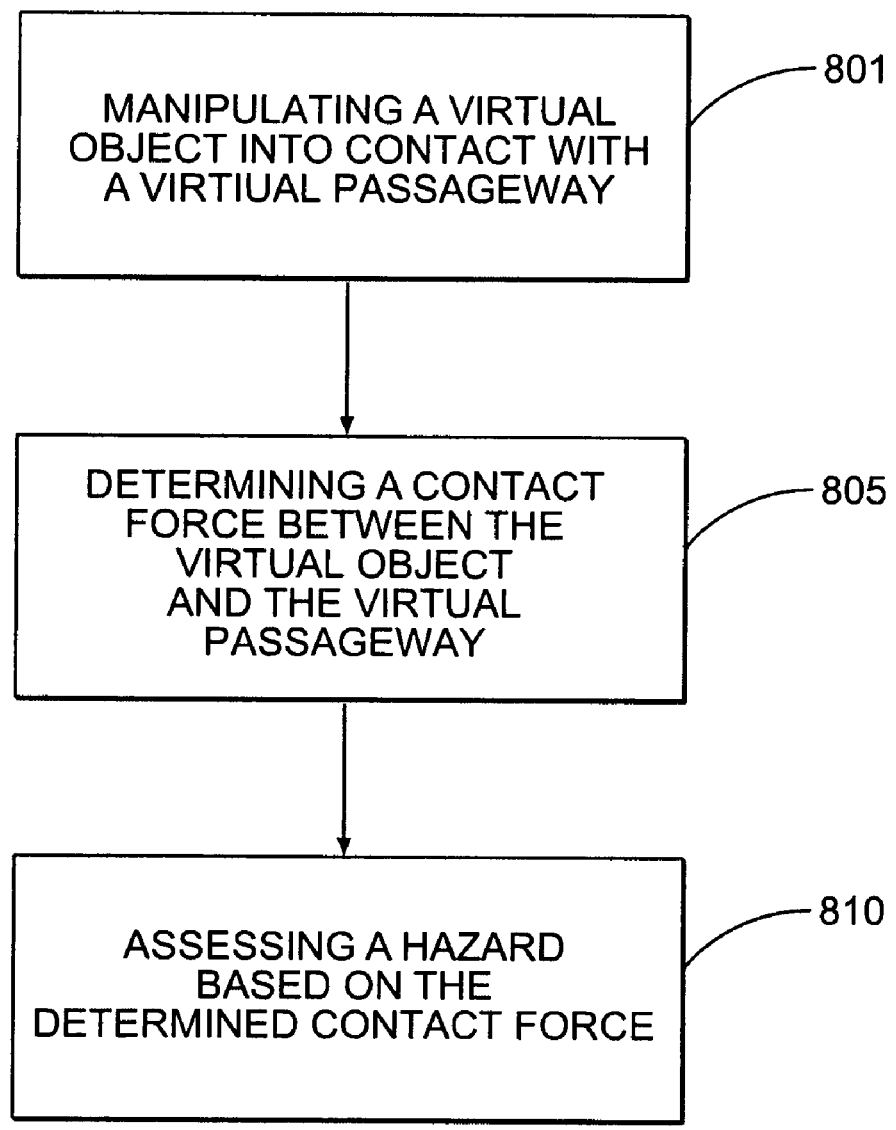
FIG. 8 is a flowchart of an exemplary method according to one embodiment of the invention.

FIG. 8 is a flowchart of an exemplary method according to one embodiment of the invention. In this method, using the cursor to manipulate the virtual object, the user may place the virtual object at any location within the virtual passageway at step 801. The virtual object may then interact with a virtual passageway and any related tissues, muscles, and the like. This interaction generates computer signals that cause the haptic input/output device to deliver a tactile feedback force, which may be felt by the user to represent the feel of the virtual object moving along the virtual passageway. At step 805, the magnitude of a contact force exerted between the virtual object and the virtual passageway may be calculated by the computer processor. Optionally, this step may represent a tactile feedback force sensed by the user.

Based on the magnitude of the contact force and (optionally) degree of occlusion, a hazard associated with the virtual object is assessed at step 810 by the user, and/or optionally, the computer processor. For example, the computer processor may feed the determined value of the contact force to a comparator for comparison with a previously determined threshold value, equal to or above which the virtual object is likely to lodge within the passageway, and below which the virtual object is not likely to lodge within the passageway. This may then be translated into a scale of hazard. Similarly, the computer may determine the degree of occlusion associated with a lodged object and calculate a degree of hazard associated with such occlusion and/or display the degree of occlusion enabling the user to assess the hazard. This may be based on a percentage of occlusion of the virtual passageway by the virtual object. In one example, 100% occlusion is considered a high hazard, and 10% occulsion is considered a low hazard.

Figure 9:
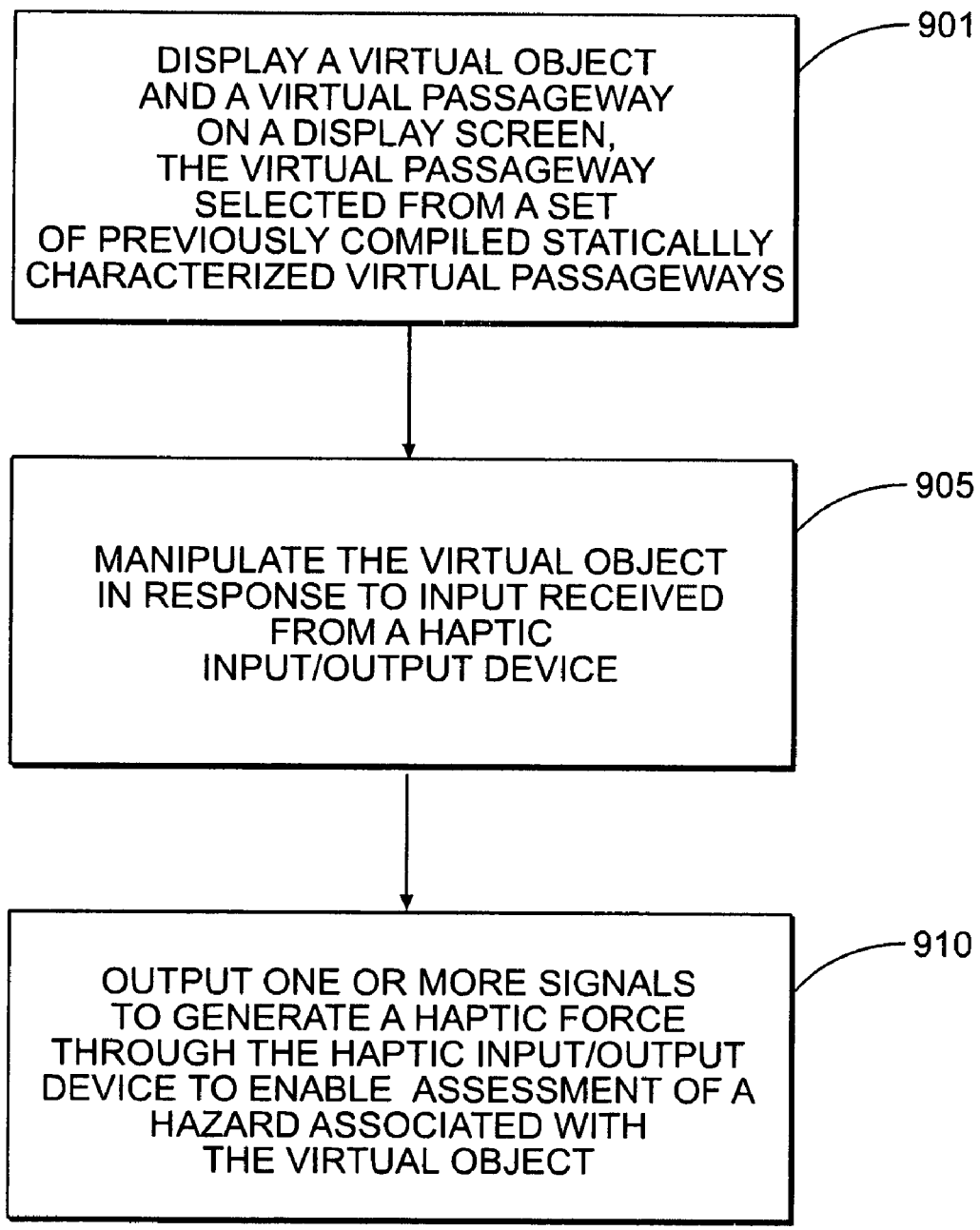
FIG. 9 is a flowchart of another exemplary method according to one embodiment of the invention.

FIG. 9 is a flowchart of another exemplary method according to one embodiment of the invention. At step 901, a virtual object and a virtual passageway are displayed on a display device. In one implementation, the virtual passageway is selected from a set of previously compiled statistically characterized, anatomical passageways. At step 905, a haptic input/output device coupled to a cursor displayed on the display device is used to move the virtual object within, or to a certain location within, the virtual passageway. At step 910, computer signals representative of the contact force between the virtual object and the haptic layer lining the interior surfaces of the virtual passageway are output to generate a tactile force. The tactile force simulates the feel of the virtual object moving along the virtual passageway to enable assessment of a hazard associated with the virtual object.

Figure 10:
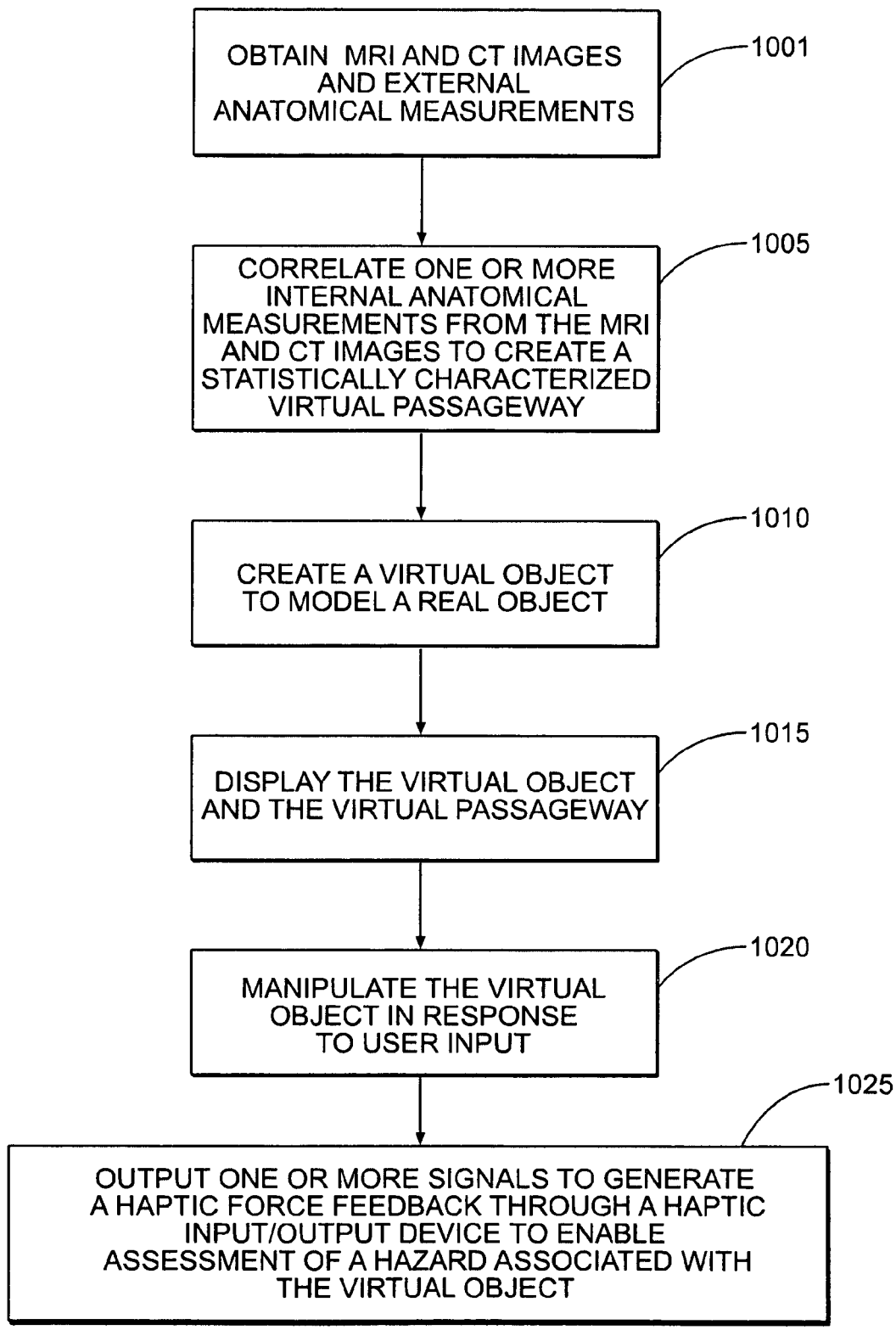
FIG. 10 is a flowchart of yet another exemplary method according to one embodiment of the invention.

FIG. 10 is a flowchart of yet another exemplary method according to one embodiment of the invention. In this method, MRI, CT, and/or other anatomical or radiological data is obtained at step 1001. This data is used to create one or more statistically characterized virtual passageways at step 1005 used to model an interaction with a real object (step 1010). The virtual object and the virtual passageway are both displayed on a display device at step 1015. At step 1020, the virtual object is manipulated in response to input received from a haptic input/output device. In response to contact between the virtual object and the virtual passageway, signals are output to the haptic input/output device that cause the device to simulate a contact force exerted between the virtual object and the virtual passageway to enable assessment of a hazard associated with the virtual object at step 1025. This simulated force may now be used by the user to assess a hazard of lodgment of the object at a certain location of the passageway.

Figure 11:
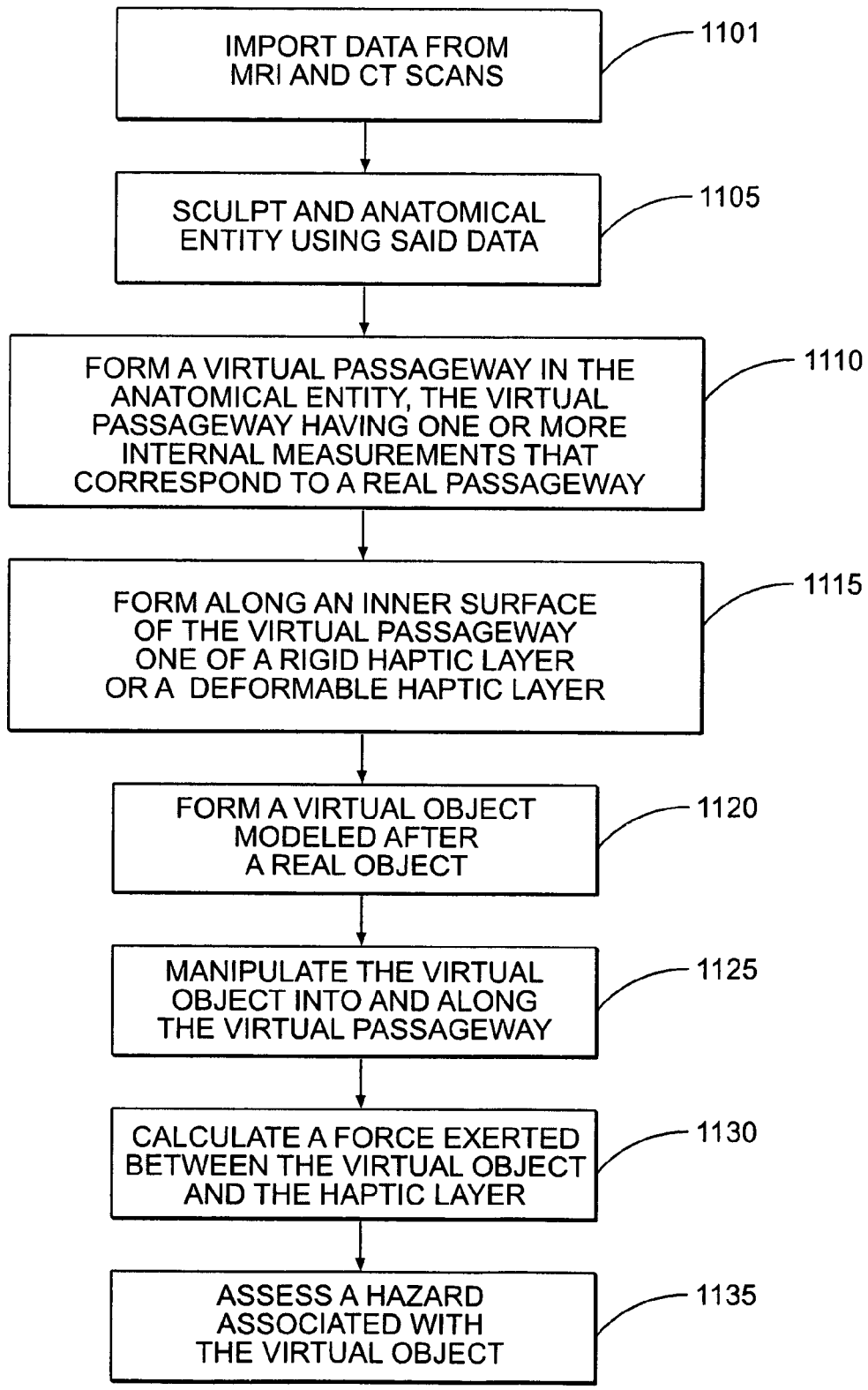
FIG. 11 is a flowchart of yet another exemplary method according to one embodiment of the invention.

FIG. 11 is a flowchart of yet another exemplary method according to one embodiment of the invention. In this method, data is imported from magnetic resonance imaging and computer tomography scans at step 1101. A combination of MRI and CT scans may be used in combination with other statistical or studies. At step 1105, an anatomically correct feature is created using the data. A virtual passageway is formed within the feature at step 1110, such as a trachea, for example. The virtual passageway includes one or more internal measurements that correspond to a real passageway, and may include one of a rigid haptic layer or a deformable haptic layer formed along an inner surface of the virtual passageway (step 1115). At step 1120, virtual object modeled after a real object is formed. The virtual object may be rigid or deformable. At step 1125, the virtual object is placed, via computer simulation or signals generated from a user-initiated force applied, to the haptic input/output device, within the virtual passageway. The magnitude of the force exerted between the virtual object and the virtual passageway (or haptic layer) is determined at step 1130 and a hazard associated with the virtual object is assessed at step 1135, either by the user feeling the tactile force feedback, and/or, optionally, the computer processor.

Method of Using the Invention

In use, the computer processor transforms raw data obtained from magnetic resonance imaging (MRI) scans and computer tomography (CT) scans, as well as other data input by a user, alone or in combination, into two-dimensional or three-dimensional, anatomically correct, models of various parts of the human body. The computer processor also transforms additional input data into a two-dimensional or three-dimensional model of a manufactured or yet to be manufactured object to be assessed for hazard that includes the exact dimensions and material properties of a real object.

These geometric and material property virtual models may be transferred into a mathematical representation of the solid models using various forms of general finite element formulations. This model has the ability to numerically determine stress and strain in the model as a result of input loads. This connectivity of this virtual model to the user feedback device enables this virtual model to act as a haptic model. This virtual haptic model receives vector forces provided by the user through the haptic device. Those vector forces may be input as loads to the above mentioned numerical model. The model also includes a collision detection routine which tracks the position of the product and compares that with the position of the human anatomy part of the virtual model. When collisions are detected, the model calculates the resulting stress and strains based on the user input force vectors.

The computer processor may calculate one or more forces caused by the interaction of the virtual object with the virtual passageway. Illustratively, calculations may be performed using, but are not limited to, general finite element methods, simplifications of finite element methods, implicit surface techniques, feature-based modeling and deformation techniques, geometric algorithms, subdivision surfaces techniques, mesh processing techniques, point-based modeling techniques, and interactive modeling techniques.

Once the magnitudes of the force (or forces) are calculated, the processor may output signals that cause the magnitude(s) of the one or more forces to be indicated on the display device. The processor may also output signals that cause the haptic input/output device to generate a tactile feed back force so the user can feel the interaction of the virtual object with the virtual passageway. The processor may further output signals that cause one or more areas of the virtual passageway to deform and/or to change color in proportion to a magnitude of a force exerted between the haptic layer and the virtual object.

In an implementation, the processor may analyze the intensities of a force or forces generated by the interaction to determine whether the virtual object poses a hazard to the virtual passageway. For example, through experimentation, a threshold magnitude of a contact force may be established for a particular object/passageway combination, at and above which the object will obstruct or partially obstruct the passageway, and below which the object will not obstruct or partially obstruct the passageway.

In use, the computer processor may cause a comparator to compare the magnitude of a virtual contact force (e.g., an estimation of a force caused by the interaction of the virtual object with the virtual passageway) with the magnitude of the predetermined threshold force. If the magnitude of the virtual contact force is equal to or greater than the magnitude of the pre-determined threshold force, the computer processor may output signals that cause a warning to be displayed on the display device. Additionally, the computer may provide signals that cause the haptic input/output device to temporarily lock in a fixed position, and/or signals that cause an area of the virtual passageway where the virtual object will likely lodge to highlight or change color. Similarly, if the comparator determines that the magnitude of the virtual contact force is less than the magnitude of the predetermined threshold force, the computer processor may output signals that cause an indication of the magnitude of the virtual contact force to be displayed on the display device.

Rigid Virtual Object,
Rigid Virtual Passageway/Haptic Layer

In this embodiment, all virtual features, including the virtual object, the virtual passageway, and the haptic layer (not shown), are treated as perfectly rigid, non-deformable objects. On the display device, the only visible change is a motion of the virtual object in response to signals input to the computer from the haptic input/output device. In this embodiment, collisions between the virtual object and the haptic layer felt through the haptic input/output device are always rigid.

This embodiment enables a determination of whether the virtual object may be inserted within and moved along the virtual passageway, where the virtual object might stop or lodge if it is not capable of traversing the virtual passageway, and (optionally) the degree of occlusion or blockage caused by the object. However, this embodiment does not provide information on deformations of the virtual object or the virtual passageway, and may not provide information on a magnitude of a force required to lodge or dislodge the virtual object.

The dimensions of the haptic layer used in this embodiment may correspond to the normal interior dimensions of a nondeformed passageway, or to a set of intermediate dimensions. In the latter case, the virtual object may be seen to pass through one or more reference layers, and felt to stop as it contacts the haptic layer.

Rigid Virtual Object,
Deformable Virtual Passageway

In this embodiment, the virtual object is created to be much stiffer than any tissues comprising an actual passageway. Consequently, the actual material properties of the virtual object may be ignored as it is considered to be rigid and non-deformable. By contrast, the virtual passageway is made to deform per one or more material properties of its component tissues when contacted by the virtual object.

In this embodiment, a false color may be provided to one or more tissues of the virtual passageway to enable clearer viewing of the motion of these tissues as the virtual object is inserted into and travels along the virtual passageway. In this embodiment, the virtual model provides a realistic approximation for many objects known to be choking, aspiration, blocking, or ingestion hazards. By providing haptic force feedback, this embodiment enables determination of where a virtual object is likely to lodge within the virtual passageway. It also enables approximation of the forces that are likely to be associated with choking, aspiration, ingestion, or related injuries.

Deformable Virtual Small Object,
Rigid Virtual Passageway

In this embodiment, the virtual object is constructed to have a consistency that is less stiff than that of the tissues comprising an actual passageway. Thus, the actual material properties of the virtual passageway are ignored, and the virtual passageway is assumed to be perfectly rigid while the virtual object is particular material properties corresponding to an actual object that is being evaluated for hazard. It will be appreciated, that this embodiment provides a realistic approximation of very soft objects, such as those made of soft foam.

Deformable Virtual Object,
Deformable Virtual Passageway

In this embodiment, both the virtual object and the virtual passageway have realistic material properties. Thus, both the virtual object and the virtual passageway may be seen to deform as the virtual object is inserted into and/or moved along the virtual passageway. Additionally, the haptic force feedback generated by the haptic input/output device corresponds to the forces exerted between the virtual object and the virtual passageway. This embodiment is particularly useful in enabling determination of how deformations of the virtual object and/or the virtual passageway may interact to restrict a flow of air or fluid.

In an implementation, a two or three-dimensional image of the virtual object and the virtual passageway are continuously updated in real-time so that motions of the virtual object and any deformations appear to be smooth and continuous. Additionally, the force feedback provided through the haptic input-output device is updated in real-time so that all motion is felt to be smooth and continuous.

The foregoing description of one or more embodiments has been presented for purposes of illustration and description, and is not intended to be exhaustive or to limit the invention to the precise form or methods disclosed. Rather, it is intended that the scope of the invention not be limited by the specification, but be defined by the claims set forth below.

What is claimed is:

1. A system for simulating hazard assessment in humans for display, the display comprising:
at least one database comprising a plurality of pre-assembled virtual objects, a plurality virtual passageways, and a plurality of the rigid haptic layers, each of the plurality of pre-assembled virtual objects being modeled from a physical object, each of plurality virtual passageways having dimensional information modeled from a biological anatomical region, and each rigid haptic layers for detecting a force being applied to a corresponding virtual passage way;
a user interface to:
generate the plurality of pre-assembled virtual objects and the plurality virtual passageways for display;
receive a first input selecting a particular virtual object from the plurality of pre-assembled virtual objects;
receive a second input selecting a particular virtual passageway from the plurality virtual passageways;
generate the particular virtual object for display;
generate the particular virtual passageway for display, the virtual passageway comprising a corresponding rigid haptic layer retrieved from the at least one database;
generate a first reference layer that corresponds to a different anatomical entity for display, the first reference layer for detecting a first resistance;
generate a second reference layer that corresponds to a second different anatomical entity, the second reference layer for detecting a second resistance; and
receive a third input controlling movement of the particular virtual object through the particular passageway; and
a processor to:
calculate the magnitude of a force generated by interaction between the virtual object and the corresponding rigid haptic layer, the first resistance detected at the first reference layer, and the second resistance detected at the second reference layer; and
generate hazard data for display based on the calculated magnitude of the force display the interaction of the virtual object with the virtual passageway in one of a two-dimensional or three-dimensional view.

2. The system of claim 1, wherein the processor is further configured to generate the hazard data based on the calculated magnitude of the force and a degree of occlusion of the virtual passageway by the virtual object.

3. The system of claim 1, wherein the anatomical region includes material properties including at least one of tissues, surrounding tissues from which said tissues derive mechanical support, and a subset of tissues and surrounding tissues.

4. The system of claim 3, wherein the user interface is further configured to generate the corresponding rigid haptic layer that corresponds to a surface of the particular virtual passageway for display, wherein the force is determined by contact between the virtual object and the corresponding rigid haptic layer.

5. The system of claim 3, wherein the processor is configured to determine a general stress and strain on the corresponding rigid haptic layer by contact between the virtual object and the corresponding rigid haptic layer.

6. The system of claim 5, wherein one of the tissues or surrounding tissues has at least one non-anatomical color representative of an intensity of the contact force.

7. The system of claim 5, the user interface is further configured to display the general stress and strain on the corresponding rigid haptic layer by contact between the virtual object and the corresponding rigid haptic layer.

8. The system of claim 1, wherein the virtual passageway is modeled from a physical passageway selected from the group consisting of a nasal pharynx, an oral cavity, an oral pharynx, a trachea, a hypopharynx, and an esophagus.

9. The system of claim 1, wherein the particular virtual object modeled from a physical object by obtaining dimensional information and material properties substantially representative from at least one of magnetic resonance images (MRI), computerized tomography (CT) images, and radiological measurements.

10. The system of claim 1, wherein the virtual passageway provides a virtual passageway that corresponds to a different size percentile within one or more of the age groups.

11. The system of claim 10, wherein the virtual object being modeled from the physical object provides a virtual passageway that corresponds to a different size percentile within one or more of the age groups.

12. The system of claim 1, wherein the virtual object being modeled from the physical object provides material properties simulated by a modified form of a general finite element method.

13. The system of claim 12, wherein the general finite element method is a spring-mass damper model.

14. The system of claim 7, wherein the processor is further configured to detect a collision to provide a determination of when the virtual object and a portion of the virtual passageway occupy a same space.

15. The system claim 1, wherein the user interface is configured to display the virtual object modeled from a physical object and vary at least one of material properties and the dimensional information of the passageway.

16. The system of claim 1, wherein the physical object is a deformable or rigid virtual object.

17. The system of claim 1, wherein the physical object is a deformable or rigid passageway.

18. The system of claim 1, wherein the processor is further configured to determine whether the virtual object will obstruct or partially obstruct the virtual passageway, and if so, provide a hazard notification.

19. The of system of claim 1 further comprising an input/output device that when manipulated causes the virtual object to interact with the virtual passageway, and provides a force feedback as the virtual object interacts with the virtual passageway, based on the hazard data.

20. The system of claim 1, wherein the processor is further configured to calculate stress, strains, and contact force exerted between the virtual object and the virtual passageway.

21. The system of claim 1, wherein the first reference layer and the second reference layer may be toggled on or off.

22. The system of claim 1, wherein the corresponding rigid haptic layer may be turned on or off.

23. A method for simulating hazard assessment in humans for display, the method comprising:
storing in at least one database a plurality of pre-assembled virtual objects, a plurality virtual passageways, and a plurality of the rigid haptic layers, each of the plurality of pre-assembled virtual objects being modeled from a physical object, each of plurality virtual passageways having dimensional information modeled from a biological anatomical region, and each rigid haptic layers for detecting a force being applied to a corresponding virtual passage way;

generating, at a user interface, the plurality of pre-assembled virtual objects and the plurality virtual passageways for display;

receiving, at a user interface, a first input selecting a particular virtual object from the plurality of pre-assembled virtual objects;

receiving, at a user interface a second input selecting a particular virtual passageway from the plurality virtual passageways;

generating, at a user interface, the particular virtual object for display;

generating, at a user interface, the particular virtual passageway comprising a corresponding rigid haptic layer for display;

generating, at a user interface, a first reference layer that corresponds to a different anatomical entity for display, the first reference layer for detecting a first resistance;

generating, at a user interface, a second reference layer that corresponds to a second different anatomical entity, the second reference layer for detecting a second resistance;

receiving, at a user interface, a third input controlling movement of the particular virtual object through the particular passageway;

calculating, at a processor, the magnitude of the force generated by interaction between the virtual object and the corresponding rigid haptic layer, the first resistance detected at the first reference layer, and the second resistance detected at the second reference layer; and generating, at the processor, hazard data for display based on the calculated force.

24. The method of claim 23, wherein the anatomical region includes material properties including at least one of tissues, surrounding tissues from which said tissues derive mechanical support, and a subset of tissues and surrounding tissues.

25. The method of claim 24, wherein one of the tissues or surrounding tissues has at least one non-anatomical color representative of an intensity of the contact force.

26. The method of claim 23, wherein the virtual passageway is modeled from a physical passageway selected from the group consisting of a nasal pharynx, an oral cavity, an oral pharynx, a trachea, a hypopharynx, and an esophagus.

27. The method of claim 23, wherein generating, at the user interface, the virtual object modeled from the physical object includes obtaining dimensional information and material properties substantially representative from at least one of magnetic resonance images (MRI), computerized tomography (CT) images, and radiological measurements.

28. The method of claim 27, wherein material properties associated with the virtual passageway are obtained from statistical means.

29. The method of claim 28, wherein the material properties are adjustable.

30. The method of claim 23, wherein the virtual passageway provides a virtual passageway that corresponds to a different size percentile within one or more of the age groups.

31. The method of claim 23, wherein the virtual object being modeled from the physical object provides material properties simulated by a modified form of a general finite element method.

32. The method of claim 31, wherein the general finite element method is a spring-mass damper model.

33. The method of claim 23 further comprising providing a force feedback, at the user interface, as the virtual object interacts with the virtual passageway.

34. The method of claim 33 further comprising determining, at the processor, a location of where the virtual object obstructs or partially obstructs the virtual passageway based on the force feedback.

35. The method of claim 34 further comprising determining, at the processor, one or more forces associated with choking, aspiration, ingestion, blocking, or injury hazards based on the force feedback.

36. The method of claim 23, wherein calculating, at the processor, the magnitude of the force further comprises calculating the contact force exerted between the virtual object and the virtual passageway.

37. The method of claim 23, wherein calculating, at the processor, the magnitude of the force further comprises calculating the contact force exerted between the virtual object and the virtual passageway.

38. The method of claim 23, wherein the first reference layer and the second reference layer may be toggled on or off.

* * * * *